United States Patent Office 2,920,905
Patented Jan. 12, 1960

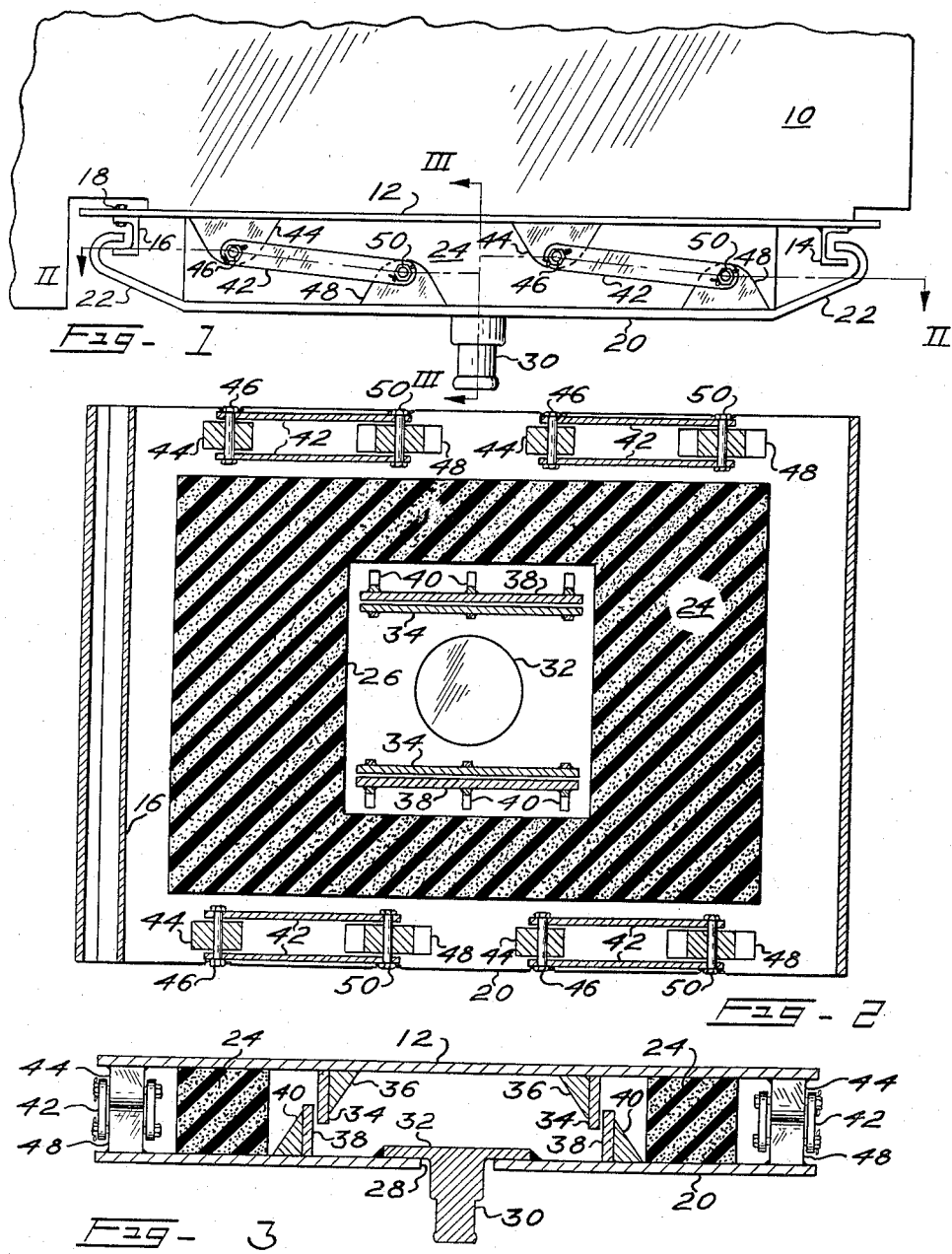

2,920,905

VEHICLE LOAD SUSPENSION FOR FIFTH-WHEEL TYPE HITCH

Joseph A. Cekada, Mayfield Heights, John J. Evans, Mentor, and Phillip H. Stiles, Cleveland, Ohio, assignors to the United States of America as represented by the Secretary of the Army Application April 7, 1958, Serial No. 727,011

6 Claims. (Cl. 280—440)

The invention relates to a vehicle load suspension assembly, and particularly relates to a load suspension used with a fifth wheel type hitch for a semi-trailer.

Proper suspension of vehicle trailers is important to prevent damage to the freight being transported, and conventional leaf sprung axles are usually employed to mount the wheels of the trailer to the trailer frame for this purpose. However, as the front end of a semi-trailer is supported by the tractor truck, the tractor suspension must provide the cushioning effect to prevent road irregularities from causing shocks which may be transmitted to the freight through the fifth wheel. Since the conventional tractor truck suspension is very stiff, adequate cushioning is not provided for fragile and delicate material transported in the trailer and damage thereto often results. The problem of trailer suspension becomes very important wherein the trailer is used to transport radio, radar and other electronic equipment as is often carried by military vehicles.

It is thus an object of the invention to provide a vehicle load suspension for use with a trailer which produces a cushioning effect between the trailer and the supporting tractor truck.

Another object of the invention is to produce a vehicle load suspension utilizing a resilient shock absorbing member whereby vertical loads only are transmitted to the resilient member, horizontal loads being bypassed around said member through rigid linkage means.

Yet a further object of the invention is to produce a suspension for use with a fifth wheel hitch assembly utilizing foam rubber whereby the foam rubber is subjected only to tension and compression forces.

Another object of the invention is to provide a fifth wheel suspension assembly which is economical to manufacture and is of a compact space-saving design readily adaptable to existing trailers.

These and other objects of the invention may be better understood and will become apparent upon study of the following specification and accompanying drawings wherein:

Fig. 1 is an elevational view of the invention as mounted on a semi-trailer van.

Fig. 2 is a cross-sectional plan view of the invention taken along the line II—II of Fig. 1.

Fig. 3 is a cross-section elevational view of the invention taken along the line III—III of Fig. 2.

The structure embodying the invention is entirely located adjacent the pivot plate and king pin used to connect a semi-trailer van to a tractor truck and, as shown in Fig. 1, is attached to the underside of the front end of the trailer van 10. It will be apparent that the invention may be used with any semi-trailer using a king pin hitch and is not limited to any particular trailer body type. The assembly consists of the support plate 12, which is of rectangular form, fastened to the underside of van 10 by bolts, welds or other conventional means. A pair of U-shaped channel irons are affixed to the lower side of plate 12 transverse to the direction of the trailer length and extend the width of the plate. The channel 14 may be welded to the plate 12, and the channel 16 is fastened to the plate by bolts 18 to facilitate assembly.

The pivot plate 20 is held in parallel spaced relation to support plate 12 by the resilient shock absorbing medium as will be later explained. As noted in Figs. 2 and 3, the plate 20 is of the same width as plate 12, and the front and rear edges are formed upwards and inwardly as at 22 to extend into the trough of channels 14 and 16.

As shown in Fig. 3, a shock absorbing cushion 24 is sandwiched between support plate 12 and plate 20 and is bonded to each of the plates 12 and 20. To obtain the best combination of shock absorbing qualities with durability and riding characteristics, the cushion 24 is preferably composed of foam rubber. Cushion 24 is of rectangular configuration and is provided with a section 26 from which the resilient cushion material is removed to permit clearance for the king pin and anti-sway device.

A hole 28 is formed centrally in plate 20, and the kingpin 30 projects through the hole 28 for engagement with the hitch of the tractor truck. Kingpin 30 is formed with a base 32 which is welded to the plate 20 rendering kingpin 30 an integral part of plate 20.

As best shown in Fig. 3, the anti-lateral displacement means or anti-sway device consists of a pair of vertical inner ribs 34 affixed to support plate 12 by webs 36 and outer ribs 38 affixed to plate 20 by the webs 40. Ribs 34 and 38 extend parallel to the longitudinal axis of the trailer, the smooth face of the inner ribs 34 being in close proximity to the smooth face of outer ribs 38. Thus, relative lateral deflection of support plate 12 and plate 20 will be restrained by contact between one of the pair of ribs 34–38 depending on the direction of deflection.

A linkage system is used to prevent relative longitudinal displacement between support plate 12 and plate 20 and consists of a pair of double linkages 42 located on opposite sides of the assembly which are pivotally connected at one end to the bosses 44 by the pin 46 and attached at the other end to the bosses 48 by the pivot pin 50. As observed, the bosses 44 are welded to the plate 12 while the bosses 48 are affixed to plate 20, thus the links 42, extending in the longitudinal direction of the trailer, will permit plates 12 and 20 to move toward and away from each other in a vertical direction, yet will transmit any horizontal longitudinal forces between the plates without imposing shearing stresses on the cushion 24.

Excessive vertical displacement between plates 12 and 20 is prevented by the coaction of the channels 14 and 16 with the inwardly formed ends 22 of plate 20 whereby the end 22 will contact the upper legs (Fig. 1) of the channels if abnormal vertical pressure is imposed on either plate 12 or 20, and will contact the lower legs of channels 14 and 16 to prevent tension and fatigue failures of cushion 24 caused by the weight of plate 20 when the trailer is unhitched for long periods of time.

The density, thickness and area of the cushion 24 are designed in accordance with the load limitations of the trailer whereby normal vertical bumps and shocks transmitted to the tractor truck due to uneven terrain or other causes will be absorbed and dissipated in the cushion 24 and not transmitted to the trailer itself. Under normal load conditions the ends 22 of plate 20 will be spaced approximately midway between the upper and lower legs of channels 14 and 16.

It will thus be understood that the invention discloses a vehicle load suspension assembly which may be used with semi-trailers to provide shock absorbing means between the trailer and the fifth wheel of the tractor truck without requiring modification in either the tractor or van.

The foam rubber cushion 24 will absorb and deaden forces tending to compress or tension the material of the cushion, yet the ribs 34 and 38 and the linkages 42 prevent lateral and longitudinal movements of the trailer or tractor from transmitting shear forces to the resilient cushion 24. This is important in that the rubber cushion 24 would soon fail and break apart if subjected to the shear forces common in semi-trailer hitch assemblies. Thus, the relationship of the ribs 34 and 38 and the use of linkages 42 permit the horizontal or shear forces to be transmitted around the cushion 24, yet all the vertical forces will be imposed on the cushion alone.

It will be understood that the invention is not confined to the illustrated embodiment, and modifications employing the concepts of the invention may be apparent to those skilled in the art without departing from the spirit and scope thereof.

We claim:

1. A vehicle suspension assembly comprising a support plate attachable to a trailer, a shock absorbing cushion bonded to said support plate, a second plate bonded to said cushion in spaced relation to said support plate, a first pair of spaced parallel ribs mounted on said support plate, a second pair of spaced ribs mounted on said second plate in parallel, interlocking relation with said first pair of ribs and a plurality of pivotally mounted linkages interconnecting said plates, the pivots of said linkages being at right angles to said first and second pairs of ribs.

2. In a vehicle suspension assembly as in claim 1 wherein said shock absorbing cushion is formed of foam rubber.

3. A vehicle suspension assembly comprising a support plate, a foam rubber cushion bonded to said support plate, a second plate bonded to said cushion in spaced relation to said support plate, a first pair of spaced parallel ribs mounted centrally on said support plate, a second pair of spaced ribs mounted on said second plate in parallel, interlocking relation with said first pair of ribs, a plurality of pivotally mounted linkages interconnecting said plates permitting a relative change in distance between said plates, the pivots of said linkages being at right angles to said first and second pairs of ribs and a kingpin affixed to said second plate.

4. A vehicle suspension assembly comprising a support plate attachable to a trailer, a second plate in spaced substantially parallel relation to said support plate and having a kingpin extending therefrom, a shock absorbing cushion secured between said support and second plates, spaced overlapping mutually abuttable members respectively extending from said support and second plates restraining relative lateral movement thereof in one direction, and linkage pivotally interconnecting said support and second plates by respective relatively laterally spaced pivotal axes thereon at an angle to said members on said plates restraining relative lateral movement thereof in another direction.

5. A vehicle suspension assembly comprising a support plate attachable to a trailer, a second plate in spaced substantially parallel relation to said support plate and having a kingpin extending therefrom, a shock absorbing cushion secured between said support and second plates, spaced overlapping mutually abuttable members respectively extending from said support and second plates restraining relative lateral movement thereof in one direction, linkage pivotally interconnecting said support and second plates by respective relatively laterally spaced pivotal axes thereon at an angle to said members on said plates restraining relative lateral movement thereof in another direction, and spaced mutually engageable members respectively on said support and second plates for preventing excessive vertical displacement between said plates in either direction.

6. A vehicle suspension assembly for a semi-trailer using a kingpin hitch comprising, in combination, a support plate attachable to a trailer, a second plate in spaced substantially parallel relation to said support plate, a foam rubber cushion secured between said support and second plates, a first pair of spaced parallel members on said support plate extending toward said second plate, a second pair of spaced parallel members on said second plate extending toward said support plate in respective spaced overlapping abuttable relation to said first pair of members, and a plurality of linkages pivotally interconnecting said support and second plates by respective relatively laterally spaced axes thereon disposed angularly to said members.

References Cited in the file of this patent

UNITED STATES PATENTS

| | | |
|---|---|---|
| 2,733,931 | Reid | Feb. 7, 1956 |
| 2,792,231 | Compton | May 14, 1957 |
| 2,821,409 | Chalmers | Jan. 28, 1958 |
| 2,859,978 | Brimhall | Nov. 11, 1958 |